Figure 2:
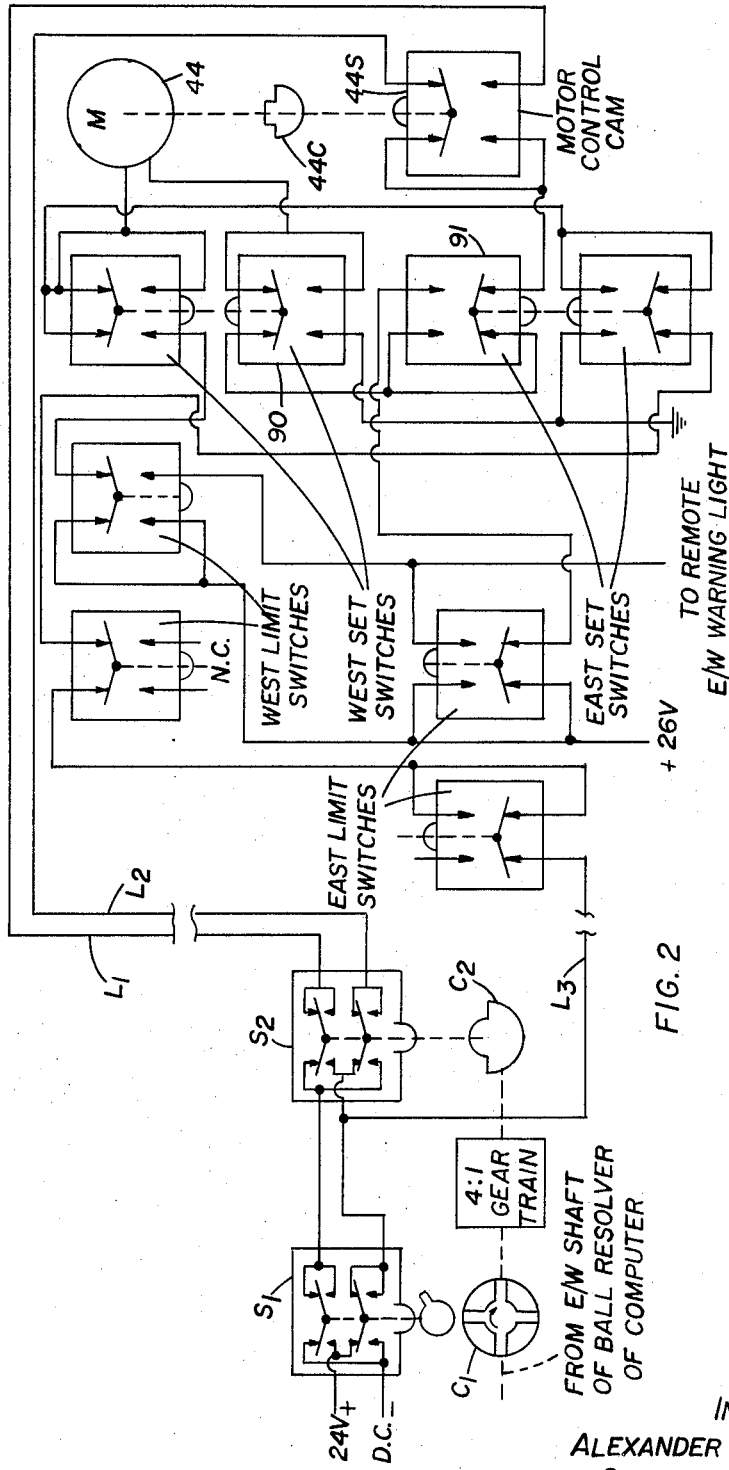

May 3, 1966     A. C. SMART     3,249,914
VEHICULAR NAVIGATION SET
Filed Jan. 11, 1963     4 Sheets-Sheet 1
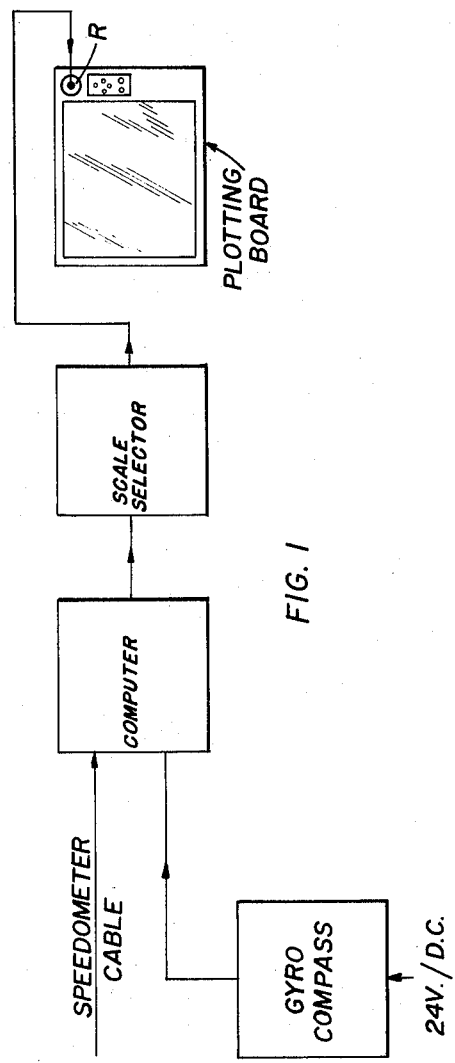
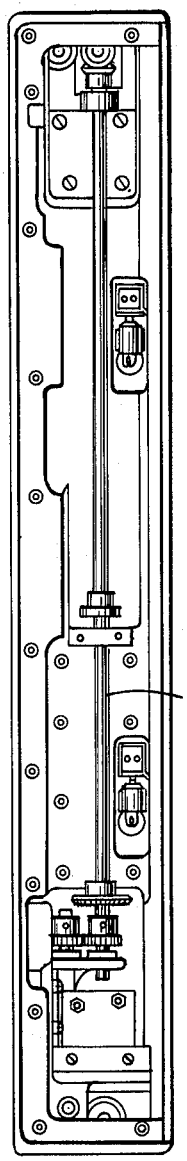
INVENTOR
ALEXANDER C. SMART
BY- *Smart + Biggar.*
ATTORNEYS.

May 3, 1966        A. C. SMART        3,249,914

VEHICULAR NAVIGATION SET

Filed Jan. 11, 1963        4 Sheets-Sheet 2

INVENTOR
ALEXANDER C. SMART

BY— *Smart & Biggar.*

ATTORNEYS

May 3, 1966     A. C. SMART     3,249,914
VEHICULAR NAVIGATION SET

Filed Jan. 11, 1963     4 Sheets-Sheet 3

INVENTOR
ALEXANDER C. SMART
BY- *Smart & Biggar*
ATTORNEYS

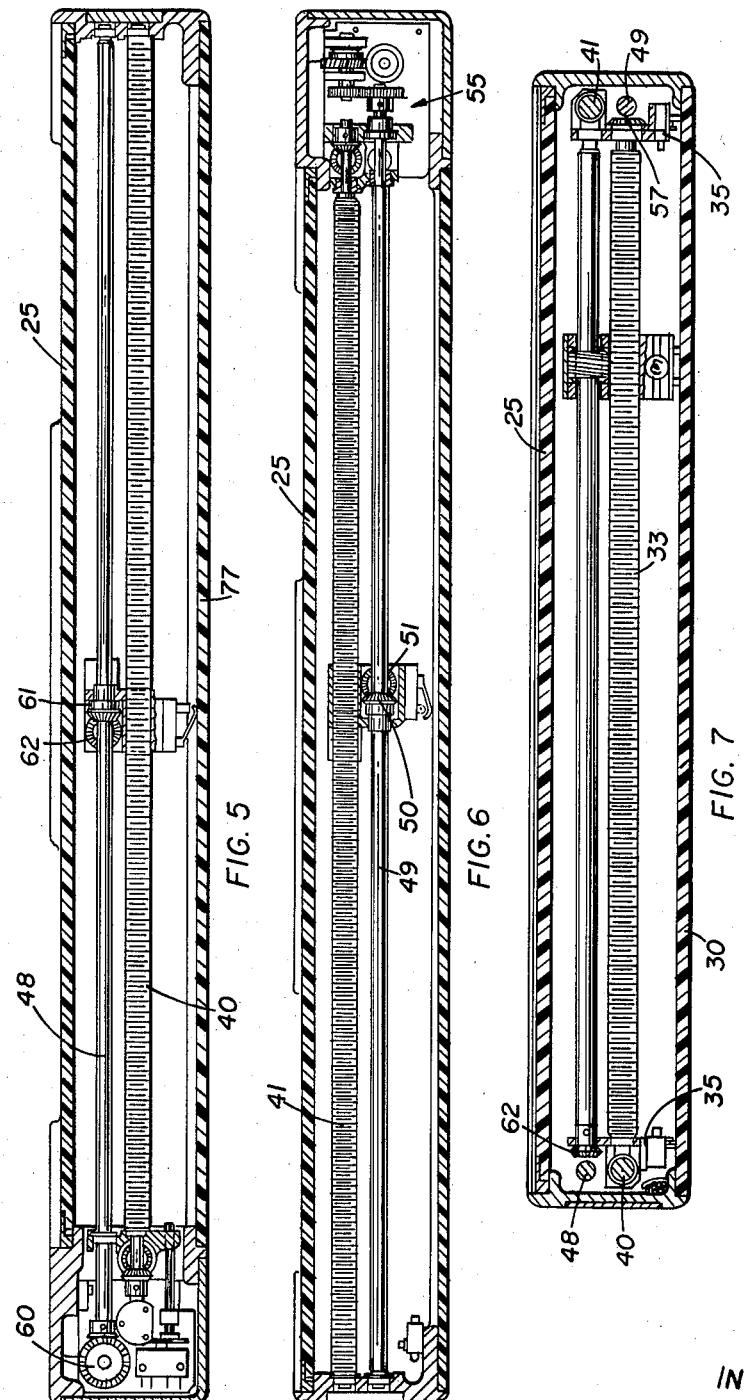

United States Patent Office 3,249,914
Patented May 3, 1966

3,249,914
VEHICULAR NAVIGATION SET
Alexander Charles Smart, Ottawa, Ontario, Canada, assignor to Her Majesty the Queen in right of Canada as represented by the Minister of National Defence
Filed Jan. 11, 1963, Ser. No. 250,897
Claims priority, application Canada, Mar. 28, 1962, 845,461
3 Claims. (Cl. 340—24)

This invention relates to navigational devices particularly navigational devices for land vehicles.

In the operation of an armoured vehicle such as a tank which is capable of moving away from highways into open country, one of the needs which constantly arises is a requirement to know the instantaneous geographical position of the vehicle and its heading. Hitherto the tank commander has observed his position by map reading and obtained his heading by reference to a compass somewhere in the vehicle. In tank actions the tank commander has in addition to fighting his vehicle, the strain of having to continually plot his vehicle position.

The present invention overcomes the necessity for the tank commander to keep an up-to-the-minute plot of the tank's position by providing a portable navigational display unit adapted for use with plug-in means capable of supplying as inputs to the unit, continuous electrical analogue signals of the Cartesian coordinates of change in vehicle position and a continuous electrical analogue signal of the instantaneous vehicle heading, which display unit comprises a box-like housing, socket means in said housing adapted to receive said plug-in means, a transparent presentation screen adapted to receive a chart; a projector mounted for movement within said housing beneath said presentation screen; means responsive to the continuous input analogue signals of the change in vehicle position to drive said projector to a position wherefrom it can project a light image onto the screen to display the instantaneous vehicle geographical position on the chart when in place in the screen; heading image means on said projector; means responsive to the continuous input analogue of instantaneous vehicle heading to orient said heading image means to project a light image of vehicle instantaneous heading on the screen; and switch means operable to position said projector at initial datum positions.

Preferably the switch means are mounted on the portable unit.

In accordance with a feature of the invention, the unit, limit switch means are provided which switch means are operated when the projector has reached a predetermined limit of travel to illuminate remote fixed warning lamps to indicate to an operator that a limit in projector travel has been reached and to terminate the driving of the projector against the limit switch.

Figure 3:
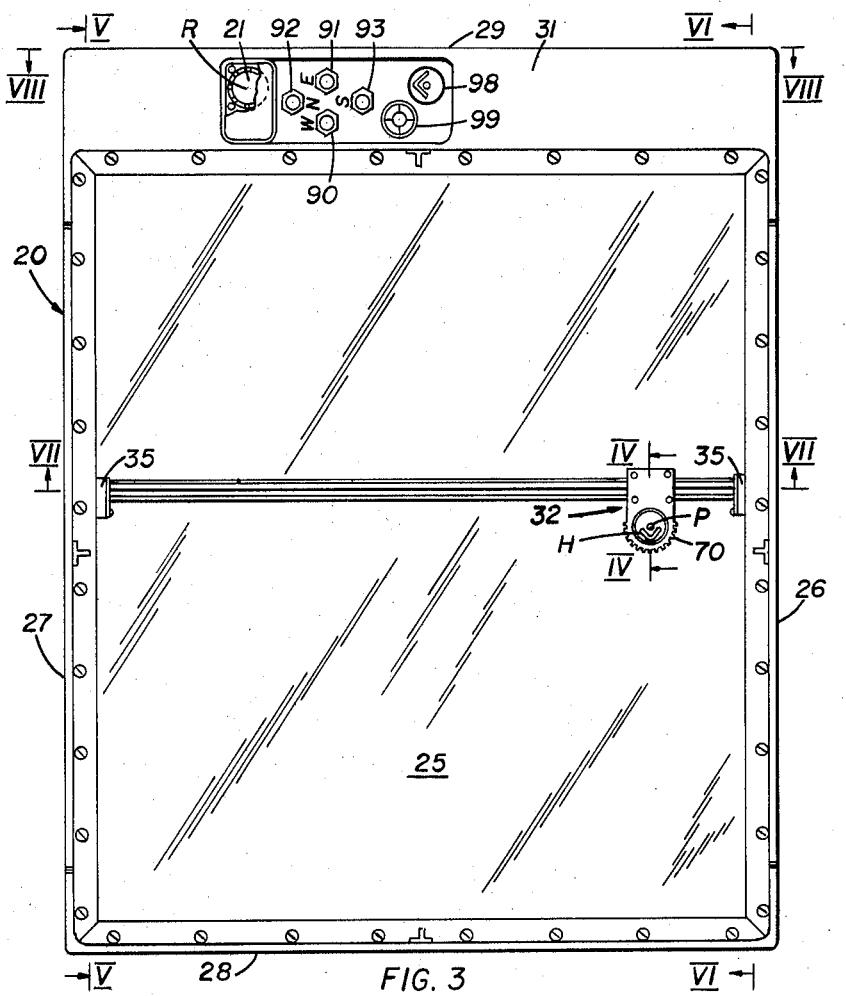
Figure 3A:
Figure 4:
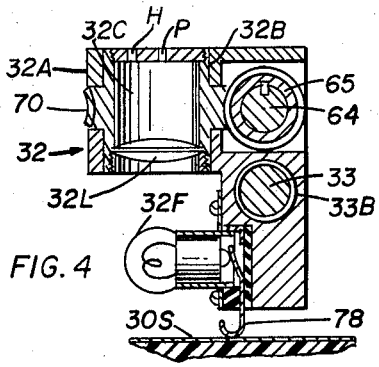

The following is a description by way of example of one embodiment of the present invention reference being had to the accompanying drawings in which:

FIGURE 1 is a block diagram indicating the data flow;
FIGURE 2 is a diagrammatic representation of the manner in which information may be transmitted;
FIGURE 3 is a plan view of the portable plotting device;
FIG. 3A is a cross section through the bottom wall of the device;
FIGURE 4 is a section on the line IV—IV of FIGURE 3;
FIGURE 5 is a section on the line V—V of FIGURE 3;
FIGURE 6 is a section on the line VI—VI of FIGURE 3;
FIGURE 7 is a section on the line VII—VII of FIGURE 3;
FIGURE 8 is a section on the line VIII—VIII of FIGURE 3; and Referring now to the drawings;

In FIGURE 1 there is schematically illustrated the nature in which the navigational information is obtained and transmitted to the device of the present invention. The vehicle speedometer cable provides an analogue input of the distance travelled by the vehicle to a computer C and a gyro compass provides a second analogue input, that of vehicle heading, to the computer. The computer which may be a standard ball resolver resolves the polar inputs of distance travelled and heading into output analogue signals of the Cartesian coordinates of the distance travelled by the vehicle along its heading. That is to say the computer provides a constant output analogue of the Cartesian coordinates of the change of vehicle position. These coordinates are known as "Eastings" and "Northings."

The output analogues from the computers are applied after a suitable correction in the scale selector S as electrical input analogues to the portable display unit 20 of the invention. These electrical analogues together with a 24 volt D.C. power supply are transmitted via an electrical cable and a plug R, which is received in the electrical socket 21 on the top face of the portable display unit 20. The transmission from the computer C is preferably of a step-by-step nature and in the embodiment illustrated in FIGURE 2, of a pulsating nature.

FIGURE 2 shows schematically the manner in which the "Eastings" are transmitted and received. For the sake of simplicity the scale selector S has been omitted as has a representation of the manner in which the "Northings" are transmitted and received. It is considered sufficient to say the "Northings" are similiarly transmitted and received.

The direction sensing cam, $C_1$, which is directly connected to the East West shaft of the resolver, reverses the polarity of the supply voltage by throwing the switch $S_1$ when the direction of travel in that channel reverses. Once the switch $S_1$ is closed for a particular direction of travel the cam $C_1$ rotates freely without changing $S_1$ until such time as the rotation of $C_1$ reverses.

The supply voltage from the direction sensing switch is fed to the pulsing switch $S_2$. The switch $S_2$ is pulsed by the pulsing cam $C_2$, which is also mechanically coupled to the East West shaft of the resolver in the computer, to produce a pulse for, say, every 20 meters of distance travelled in that axis. Successive pulses are sent to the display unit over alternate leads $L_1$, $L_2$, with the common return $L_3$. This three wire transmission permits dynamic braking of the driving motor 44 in the display unit. It will be clear that as the motor 44 rotates the cam 44C, the switch 44S will be positioned correctly to receive the incoming pulses on $L_1$, or $L_2$. The display unit 20 is of box-like construction and has a transparent plastic top window or presentation screen 25, side walls 26, 27, end walls 28, 29, and a bottom wall 30. At the end 31 of the device there are provided the motors for driving the projector and the pulse receiving switches such as illustrated schematically in FIGURE 2 with respect to the "Eastings." The projector 32 is mounted for transverse movement on a lead screw 33 within the unit beneath the presentation screen 25.

The projector comprises a body member 32A having a threaded bore 33B adapted to receive the lead screw 33. A vertical bore 32B accommodates a rotatable image carrying member 32C and a lens 32L therebeneath. Mounted on the body member 32A beneath the lens 32L is an electric lamp 32F.

The lead screw 33 extends transversely of the unit 20 and terminates at both ends in a carriage 35. As will be seen from FIGURE 5 the carriage 35 is provided with a longitudinally extending threaded bore on each side to accommodate the longitudinally extending lead screws 40, 41. The lead screws are driven by the motor 44 and are mechanically connected by a transversely extending shaft and the gear arrangement 46 at the end of 31 of the unit (see FIGURE 8).

The lead screws 40 and 41 drive the carriage to and fro longitudinally and act as guides therefor, Lead screw 40 is arranged above the level of the lead screw 41 and this arrangement prevents the carriage 35 from being misaligned during operation.

Extending parallel with the lead screws 40, 41 are keywayed shafts 48, 49 provided with longitudinally extending key ways. The carriage 35 carries at both sides a pair of meshing bevel gears. As will be seen from FIGURES 6 and 7 lead screw 33 carries at one end the bevel gear 50 mounted in the carriage 35 and this gear meshes with a bevel gear 51 also mounted on the carriage 35 and slidably arranged in the key-way in the shaft 49. Thus transverse movement of the projector within the unit is achieved by driving the "Northing" motor so as to drive the keywayed shaft 49 with its gear 50 and through gear 51 the lead screw 33 to drive the projector to and fro transversely within the unit in the lead screw 33.

The heading analogue signal drives the rotatable image carrying member 32C by means of a heading motor, not shown, through the keywayed shaft 48 bevel gears 61 and 62 on the carriage 32 (FIGURE 4) and keywayed shaft 64. The keywayed shaft 64 has the worm wheel 65 slidably mounted thereon and carried within the body member 32A of the projector, which worm wheel meshes with the pinion wheel 70 which is drivingly attached to the image carrying member 32C so that rotation of the worm wheel 65 causes rotation of the member 32C. In view of this long mechanical linkage a servo follow up loop is driven with the heading analogue signal to overcome the torque.

As will be seen in FIGURES 1 and 3 the projected position image is obtained by projecting light from the lamp 32F through a small hole P in the top of the member 32C whilst the projected heading image is formed by the light from the lamp 32F through the image arrowhead, or V-shaped slot H.

In order to provide electric power for the lamp 32F beneath the lens 32L of the projector, the bottom well 30 of the unit is provided with a copper surface 30S which is electrically connected to the 24 volt input and power is taken off by the spring connection 78 on the projector.

Limit micro-switches are provided on the ends of the carriage 35 engageable by the projector 32 at the limit of its travel by the lead screw 33. These limit switches are in electrical contact with copper strips 30A and 30B (FIGURE 3A) and operate relays to disconnect the "Northing" motor from the leads which carry the drive pulses. Further limit micro switches are provided for the unit engageable by the carriage 35 at the limits of its longitudinal travel. When operated these switches disconnect the motor 44 from the leads which carry the drive pulses. Both sets of limit switches operate remote lamps on a panel at the operator's position in the vehicle to indicate that the carriage 35 or the projector 32 has reached a limit of its travel.

At the end 31 of the unit and mounted to be readily engageable by the operator, are setting or slewing push button switches 90, 91, 92 and 93. By pushing the buttons the operator can run the lead screw driving motors to position the spot of light projected from the index hole P on the screen 25 at the desired datum starting position. Release of the slewing switches 90, 91, 92 and 93 causes the lead screw driving motors again to receive analogue information with regard to change of vehicle position and thus to move the projector in accordance with that information. Switch 98 controls the intensity of lamp 32F while switch 99 controls the intensity of the general internal lighting of the presentation screen.

In operation a chart of appropriate scale is positioned on the top of the presentation screen 25 and clipped thereto. The scale of the input information is determined by the scale selector S (FIGURE 1). The operator positions the transmitted light spot from the index hole P to the desired starting position so that the spot will show the instantaneous geographical position of the vehicle on the chart. On releasing the slewing switches the input information from the computer takes over and the projector will follow a path to trace out a plot of the vehicle movement by a spot of light on the chart and the heading will constantly be shown by the projected arrow on the chart.

The device according to the invention may be stored away in a recess in the vehicle when the commander does not desire to follow the plot but the information will still be received and the plot will continue although the device is so stored. Thus, when the vehicle commander consults the chart it will show the vehicle's instantaneous position and heading. When the charts are to be changed the operator, by the simple expedient of operating the slewing switches, causes the projected spot to take up the position of the vehicle relative to the new chart and the plot is continued. If at any time whilst the unit is stored away, the motor 44 and the "Northing" motor drive the projector or carriage against one of the limit switches, the appropriate motor will be disconnected and a warning light will come on the panel so that the operator receives an indication that he should change charts and readjust the plot. A suitable indicator device (not shown) may be provided which is operated by the input analogues of "Eastings" and "Northings" and includes visual counters which give a numerical indication of position relative to a chart grid. With this provision the plot may be readjusted on a new map even if the operator chooses to ignore the warning light and the projector "goes off scale."

What I claim as my invention is:

1. A portable navigation display unit adapted for use with plug-in means for supplying as inputs to the unit continuous electrical analogue signals of the Cartesian coordinates of change in a vehicle position and a continuous electrical analogue signal of the instantaneous vehicle heading; which display unit comprises a box-like housing; socket means in said housing adapted to receive said plug-in means; a transparent presentation screen adapted to receive a chart; a projector mounted beneath said screen within said housing for transverse movement on the housing on a lead screw, said lead screw being mounted on a carriage adapted for longitudinal movement in the unit on second lead screw means which extend longitudinally within the unit on at least one side thereof and are adapted to drive the carriage in a longitudinal direction within the unit; means including electrical motors responsive to the continuous input analogue signals of the change in vehicle position to drive said lead screws to position said projector whereby it can project a light image onto the screen to continuously display the instantaneous vehicle geographical position on a chart, when in place on the screen; a heading image on said projector, mechanical means for rotating said heading image; means including electrical motors to drive said mechanical means in response to the input analogue of instantaneous vehicle heading to orient said image means to project a light image of vehicle heading on the screen; and switch means on said unit operable to drive each said motor to position said projector at initial datum positions.

2. A unit as claimed in claim 1 in which the said second lead screw means comprises two lead screws, mechanically coupled together, one located on each side of the unit and engaging the carriage at different depth levels within the unit.

3. A unit as claimed in claim 2 in which the mechanical means for rotating the heading image comprises a rotatable image carrying member on the projector; a pinion wheel also on the projector and connected to said member; a worm wheel on the projector for driving said pinion; a transversely extending shaft adapted to drive said worm wheel and mounted on said carriage, said shaft having a keyway thereon to permit the worm wheel to slide therealong during transverse movement of the projector within the unit; and gearing on the carriage connecting said transversely extending shaft and a keyed driving shaft extending longitudinally of the unit, said gearing being slidably mounted on the driving shaft for longitudinal movement with said carriage in said unit.

References Cited by the Examiner

FOREIGN PATENTS 646,103  8/1962  Canada.

NEIL C. READ, *Primary Examiner.*

A. H. WARING, *Assistant Examiner.*